3,562,224
POLYAMIDE POLYMERIZATION PROCESS
Rajindar K. Kochhar, Overland Park, Kans., assignor to Gulf Research & Development Company, Pittsburgh, Pa., a corporation of Delaware
No Drawing. Continuation-in-part of application Ser. No. 610,016, Jan. 18, 1967. This application Aug. 7, 1969, Ser. No. 848,341
Int. Cl. C08g 20/14
U.S. Cl. 260—78          8 Claims

ABSTRACT OF THE DISCLOSURE

Lactams having at least 7 ring members are polymerized in the presence of water and carbon dioxide.

CROSS-REFERENCE TO OTHER APPLICATIONS

This application is a continuation-in-part of application Ser. No. 610,016, filed Jan. 18, 1967, now abandoned.

BACKGROUND OF THE INVENTION

This invention relates to the polymerization of lactams. In another aspect, this invention relates to the high-pressure polymerization of lactams in the presence of water and carbon dioxide to form high molecular weight polyamides.

Conventionally, polyamides are prepared from lactams utilizing cation initiators such as phosphoric acid and acetic acid and elevated temperatures and pressures. The polyamide products of such polymerization reactions normally contain acidic residues introduced into the polymer during the reaction. A disadvantage of these conventional polymerization reactions is the viscosity instability of the product polyamides when subjected to elevated temperatures. It has been observed, for example, that the viscosity of Nylon-6, prepared by the polymerization of caprolactam and employing the conventional acid-type initiators, has a tendency to fall when the temperature of the polymer is raised to a point where the polymer can be fabricated into useful products. This may be partially attributable to the presence of free acid in the polymer.

Another disadvantage of conventional cationic polyamide polymerization processes is the long reaction time normally required to produce the polyamide polymers. Reaction times in the range of 20 to 24 hours are normal in such conventional superatmospheric polymerization systems.

Accordingly, an object of my invention is to provide a novel, cationic polymerization process for the preparation of high molecular weight polyamides.

Another object of my invention is to provide a polymerization process for the preparation of polyamides wherein the concentration of residues in the formed polyamides are reduced to a minimum.

Yet another object of my invention is to provide a cationic polymerization process for the preparation of polyamides wherein the residence time in the polymerization zone is reduced to a minimum.

Other objects, advantages, and features of my invention will be readily apparent to those skilled in the art from the following description and appended claims.

INVENTION

By my invention, high molecular weight polyamides substantially free of undesirable residues are obtained with minimum polymerization reaction times by the two-stage polymerization of a lactam having at least 7 ring members. In the initial polymerization stage, the polymerization reaction is conducted at superatmospheric pressures in the presence of water and carbon dioxide. In the second stage of the polymerization reaction, the carbon dioxide and water are removed from the polymerization zone and the monomer and polymer maintained at the polymerization temperature until polymerization is complete.

The polyamide products of this invention contain low concentrations of extractables, normally in the range of 7–12 weight percent when superatmospheric conditions are utilized, are viscosity stable at elevated temperatures and are of high molecular weight. Nylon-6 prepared by the polymerization of caprolactam will generally have a melt index less than about 40 and normally in the range of 5–25 as determined by ASTM D 1238–52T, employing a test temperature of 235° C. and a weight of 2,160 grams. Polyamides prepared from the polymerization of caprolactam by the invention normally have tensile yield strengths in the range of 7,000 to 10,000 pounds per square inch and tensile strengths at break in the range of 9,000 to 12,000 p.s.i., flexural stiffness values in the range of 150,000–200,000 foot pounds per square inch, Shore D hardness values in the range of 76 to 81 and water pick-up of about 3 weight percent.

DESCRIPTION OF INVENTION

Polyamide-forming lactams employed in the process are those lactams having at least 7 ring members, for example caprolactam, oenanthic lactam, caprylic lactam, lauric lactam or their C-substitution products such as for example 4-isopropyl caprolactam or 3-methyl caprolactam, and mixtures of different lactams.

The polymerization reaction is conducted in the presence of carbon dioxide and water with the carbon dioxide introduced into the polymerization zone as a gas or a solid. Carbon dioxide and water must be present in the polymerization zone during the initial stages of the polymerization reaction but both are removed in the latter stages of the polymerization process. By removing the water and carbon dioxide in the latter stages of the polymerization reaction, the molecular weight of the formed polyamide can be substantially increased.

In the initial stage of the polymerization reaction, the concentration of water in the polymerization zone is maintained in the range of 0.5 to 10 weight percent based on the total weight of the polymerization reaction mixture. A polymerization temperature in the range of 200 to 300° C. is maintained in the polymerization zone. Preferably, the reaction temperature is maintained between 240 and 275° C. The polymerization reaction mixture is maintained at the polymerization temperature in the initial polymerization stage for a period of time ranging from 0.5 hour to 10 hours, preferably between 1 and 5 hours.

The concentration of carbon dioxide during the initial stage of the polymerization process is critical as a minimum concentration is required to produce a highly effective catalytic agent. The concentration of carbon dioxide is most effectively defined and determined by the partial pressure of carbon dioxide gas. A carbon dioxide concentration effective to maintain a carbon dioxide partial pressure of at least 50 p.s.i.g. is required to produce a high molecular weight polymer. Preferably, the partial pressure of the carbon dioxide is maintained in excess of 150 p.s.i.g. and more preferably above 1,000 p.s.i.g. The presence of water and carbon dioxide in the polymerization zone is required until preliminary hydrolysis of the lactam has reached equilibrium conditions.

Carbon dioxide and water are removed from the polymerization system following completion of the initial stages of the reaction by, for example, venting the carbon dioxide and water. The polymerization is then continued in a second stage in an inert atmosphere such as a nitrogen atmosphere until polymerization is complete. Polymerization temperatures as described in connection with the initial stage are maintained in the polymerization zone during this second polymerization stage. A polymerization reaction time in the range of 1 to 10 hours is maintained in the second stage of the polymerization process.

Normally the total residence time for the initial and second polymerization stages will be in the range of 4 to 12 hours. This compares to residence times normally in the range of 20 to 24 hours for conventional cationic polymerization systems. High molecular weight polyamides have been prepared by the invention employing total residence times of less than 4 hours.

The following examples are presented to illustrate the objects and advantages of the invention. However, it is not intended that invention should be limited to the specific embodiment presented therein.

Example I

In this example and subsequent examples the following test procedures were employed.

| | Test method |
|---|---|
| Tensile strength, p.s.i. | ASTM D 638–64T |
| Flexural stiffness, p.s.i. | ASTM D 747–63 |
| Tensile impact, foot pounds | ASTM D 1822–61T |
| Shore "D" hardness | ASTM D 1706–61 |
| Water pick-up, percent | ASTM D 570–63 |

In this example, the effect of initially providing a high pressure with carbon dioxide in the presence of water to produce a high molecular weight polyamide wherein both the carbon dioxide and water were removed from the polymerization zone was demonstrated. 300 grams of epsilon-caprolactam and 10 ml. of water were introduced into a 1 liter magna-drive autoclave fitted with a heating apparatus, a thermowell, a means of circulating gases through the autoclave, and a means of venting off gases or vapors. The air inside the autoclave was purged with carbon dioxide and the autoclave was pressured with carbon dioxide to a pressure of 200 p.s.i.g. at ambient temperature. The reaction mixture was then heated to a temperature of 265° C. and maintained at this temperature for a period of 1 hour. During this period the pressure inside the autoclave rose to 380 p.s.i.g. The temperature was maintained at 265 to 270° C. for a period of 3 hours. Following the completion of the initial polymerization stage, steam and carbon dioxide were released and the autoclave was purged with nitrogen for 15 minutes. The reaction mixture was heated for a further period of 3 hours at an essentially atmospheric pressure and under a blanket of nitrogen.

Polycaprolactam was recovered from the autoclave in the form of a tough, heavy mass which was ground in a Wiley mill to granules of a size whereby 95 percent of such granules would pass through a sieve of ten mesh. A 16 hour extraction with hot methanol in a Soxhlet apparatus showed a weight loss of 11.2 percent. The dried and extracted material had a melt flow index of 19.83. The recovered polymer had a tensile yield strength of 9,424 p.s.i., a tensile break strength of 11,817 p.s.i. a flexural stiffness of 217,822, a tensile impact of 92.30 foot pounds, a Shore D hardness of 79 and a water pick-up of 2.7.

Example II

In this example the advantage of reducing the reaction period is clearly demonstrated. The reaction conditions employed were similar to those utilized in Example I with the exception that 400 grams of epsilon-caprolactam and 12 ml. of water were utilized. Furthermore, the time of contact between the monomer and the carbon dioxide and water at 260° C. was reduced from 3 to 2 hours. The polymer obtained gave a methanol extraction value of 9.9 percent and a melt flow index of 12.59 when measured according to the procedure described in Example I. The recovered polymer had a tensile yield strength of 9,254 p.s.i., a tensile break strength of 11,025 p.s.i., a flexural stiffness of 199,853 p.s.i., a tensile impact of 61.97 foot pounds, a Shore D hardness of 80 and a water pick-up of 3.73 percent.

Example III

Superatmospheric pressures were employed in this example to demonstrate the effectiveness of the invention to prepare a high molecular weight polycaprolactam having a relative low concentration of extractable residues and wherein the carbon dioxide and water were removed from the polymerization zone following completion of the initial polymerization stage. 300 grams of ε-caprolactam and 10 ml. of water were introduced into a 1 liter magna-drive autoclave fitted with a heating apparatus, a means for circulating gasses through the autoclave, and a means for venting off gasses or vapors. The air inside the autoclave was purged with carbon dioxide, and the autoclave was pressured with carbon dioxide so as to continuously maintain a carbon dioxide pressure in the autoclave in the range of 260–400 p.s.i. The reaction mixture was then heated to a temperature in the range of 260° C. to 275° C. and maintained in this temperature range for a period of 3 hours. Following the completion of the initial polymerization stage, steam and carbon dioxide were released from the autoclave heated at atmospheric pressure for a second three-hour period.

Polycaprolactam was recovered from the autoclave and molded samples prepared in a Minijector at a barrel temperature of 260° C. Analysis of the molded samples showed that the product polycaprolactam had a tensile yield strength of 9,424 p.s.i., a tensile break strength of 9,817 p.s.i., a flexural stiffness value of 217,822 foot pounds per square inch, a melt index of 19.83, a Shore D hardness value of 79 and a tensile impact strength of 92.3 foot pounds per square inch. Water pick-up analysis of the polycaprolactam and the concentration of extractables in the product polycaprolactam as determined by the tests described above in Example I showed that the product had a water pick-up value of 2.7 weight percent and an extractables concentration of 11.2 weight percent.

Example IV

The effectiveness of the invention to produce a high molecular weight polycaprolactam at superatmospheric pressures employing a total reaction time of only 5 hours is demonstrated by this example. 400 grams of ε-caprolactam and 12 ml. of water was introduced to the 1 liter autoclave of Example II. The autoclave was pressured with carbon dioxide to a pressure of 225 p.s.i. and the reaction mixture heated to a temperature in the range of 255 to 260° C. and maintained at this temperature for a period of 3 hours. Following completion of the initial reaction stage, the carbon dioxide and water was vented from the autoclave and the remainder of the reaction medium maintained at a temperature in the range of 255 to 260° C. for an additional period of two hours.

Polycaprolactam was recovered from the autoclave, and molded samples were prepared employing the Minijector of Example III with a barrel temperature of 288° C. Analysis of the molded samples showed that the product polycaprolactam had a tensile yield strength of 9,254 p.s.i., a tensile break strength of 11,025 p.s.i., a flexural stiffness value of 199,853 foot pounds per square inch, and a melt index of 12. Analysis of the product polycaprolactam for water pick-up and concentration of extractables by the test procedures of Example I show that the product contained 9.9 weight percent extractables and had a water pick-up of 3.7 weight percent.

Example V

This example demonstrates the effectiveness of the invention to obtain a high molecular weight polycaprolactam having a low concentration of extractables when carbon dioxide and water are maintained in the polymerization zone for a period of only one hour with a total polymerization time of 8 hours. 300 grams of ε-caprolactam and 9 ml. of water were placed in the one-liter autoclave of Example III. The autoclave was purged with carbon dioxide and then pressured to 150 p.s.i.g. with the carbon dioxide. The reaction mixture was heated to a temperature in the range of 250–260° C. and maintained at this temperature range for a period of one hour. Following this initial one-hour period the carbon dioxide and water were purged from the autoclave and the reaction mixture was maintained at the polymerization temperature for an additional period of 7 hours.

The polycaprolactam was removed from the autoclave and molded samples were prepared from the product employing the procedure described in Example III. Analysis of the molded samples shows that the product polycaprolactam has a tensile yield strength of 8,782 p.s.i., a tensile break strength of 12,769 p.s.i., a flexural stiffness value of 193,548 foot pounds per square inch, a melt index of 25.56, a Shore D hardness value of 79, and a tensile impact strength of 118.4 foot pounds per square inch. Concentration of extractables and the water pick-up of the product polycaprolactam as determined by the test procedures of the previous examples shows that the polycaprolactam contains 10.1 weight percent extractables and that the water pick-up was 3.41 weight percent.

Example VI

This example illustrates the consumption of carbon dioxide as a catalytic agent during the polymerization reaction. 300 grams of epsilon-caprolactam and 9 ml. of water were charged to the autoclave of Example I. The head space in the autoclave was purged with carbon dioxide and the autoclave was then pressurized to 150 p.s.i.g. with carbon dioxide at ambient temperature. The autoclave was sealed and slowly heated to 255° C. during the period of 1 hour and 30 minutes. The pressure within the autoclave dropped to 85 p.s.i.g. A temperature of 255 to 260° C. was maintained in the autoclave for a further period of 1 hour and 15 minutes. At the end of this period the pressure had further dropped to 40 p.s.i.g. Gases and vapors were vented from the autoclave and the autoclave repressurized to 10 p.s.i.g. with nitrogen and heated for a further period of 5 hours and 35 minutes.

The polymer product had a methanol extraction value of 10.1 percent and a melt flow index of 25.56. The polymer product had a tensile yield strength of 8,782 p.s.i., a tensile break strength of 12,769 p.s.i., a flexural stiffness of 193,548 p.s.i., a tensile impact of 118.4 foot pounds, a Shore D hardness of 79 and a water pick-up of 3.41 percent.

Example VII

This example illustrates the poor quality of the resin obtained when carbon dioxide is replaced with nitrogen in the reaction vessel. 300 grams of epsilon-caprolactam and 9 ml. of water were charged to the 1 liter autoclave of Example I. The air in the head space in the autoclave was replaced with nitrogen and the nitrogen gas was employed to supply a pressure of 40 p.s.i.g. The reactants were heated to a temperature of 250° C. during a period of 35 minutes. The reactants were maintained at a temperature of 245 to 250° C. for a further period of 7½ hours. The pressure inside the autoclave was maintained between 60 and 100 p.s.i.g. while the autoclave was being maintained at the temperature between 245 and 250° C.

The polymer product recovered had a methanol extraction value of 10.4 percent and a melt flow index of 110.0. The polymer product had a tensile yield strength of 3,865 p.s.i., a tensile break strength of 6,423 p.s.i., a flexural stiffness of 60,052 p.s.i., a tensile impact of 151.8 foot pounds, a Shore D hardness of 77 and a water pick-up of 3.22 percent.

Example VIII

This example provides further evidence that carbon dioxide actively participates in the polymerization reaction. 300 grams of epsilon-caprolactam and 9 ml. of water were introduced into a 1 liter autoclave. The autoclave was purged with carbon dioxide and then pressured to a pressure of 150 p.s.i.g. at ambient temperature with carbon dioxide. The reaction mixture was then heated to a temperature of 260° C. with the time of heating, temperature of the reaction mixture and pressure within the autoclave noted below in Table I.

TABLE I

| Time of heating, minutes: | Temperature, degrees C. | Reactor pressure, p.s.i.g. |
|---|---|---|
| 0 | Ambient | 150 |
| 25 | 100 | 120 |
| 40 | 180 | 85 |
| 55 | 230 | 80 |
| 65 | 255 | 85 |
| 85 | 260 | 60 |
| 115 | 255 | ¹ 45 |
| 125 | 255 | 40 |
| 140 | 255 | ² 10 |
| 195 | 260 | |

¹ Released carbon dioxide.
² Pressurized with nitrogen.

When the procedure was repeated with the exception that nitrogen was employed in place of carbon dioxide, the results were shown in Table II.

TABLE II

| Time of heating, minutes: | Temperature, degrees C. | Reactor pressure, p.s.i.g. |
|---|---|---|
| 0 | 25 | 40 |
| 35 | 250 | 60 |
| 80 | 245 | 100 |
| 485 | 250 | 100 |

A comparison of the two runs clearly illustrates that carbon dioxide does enter into the reaction whereas nitrogen is inert to the polymerization reaction.

Although the invention has been described with reference to specific materials, embodiments and details, various modifications and changes, within the scope of this invention, will be apparent to one skilled in the art and are contemplated to be embraced in the invention.

What is claimed is:

1. A two-stage polymerization process which comprises in a first stage heating in a polymerization zone a lactam selected from the group consisting of caprolactam, oenanthic lactam, caprylic lactam, lauric lactam and their C-alkyl substituted products of 1–3 carbon atoms to a polymerization temperature in the presence of water and carbon dioxide, maintaining a concentration of water in said polymerization zone in the range of 0.5 to 10 percent by weight of the total reaction mixture, maintaining the polymerization temperature in the range of 200 to 300° C., maintaining a carbon dioxide partial pressure of at least 50 p.s.i.g. in said polymerization zone for a period of time in the range of 0.5 to 10 hours, thereafter removing carbon dioxide and water from said polymerization zone, continuing the polymerization in a second polymerization stage in an inert atmosphere substantially free of carbon dioxide and water at a polymerization temperature in the range of 200 to 300° C. for a period of time in the range of 1 to 10 hours, and recovering a high molecular weight polyamide.

2. The process of claim 1 wherein said partial pressure of carbon dioxide is at least 150 p.s.i.g.

3. The process of claim 1 wherein the residence time in said first polymerization stage is in the range of 1 to 5 hours.

4. The process of claim 1 wherein the total residence time for the first and second polymerization stages will be in the range of 4 to 12 hours.

5. The process of claim 1 wherein said lactam is caprolactam and said polyamide recovered from said polymerization zone has a melt index below 40.

6. The process of claim 1 wherein said polymerization temperature is maintained in the range of 240 to 275° C.

7. The process of claim 1 wherein the melt index of said polyamide is less than 25.

8. The process of claim 1 wherein the inert atmosphere is a nitrogen atmosphere.

References Cited

UNITED STATES PATENTS

| | | | |
|---|---|---|---|
| 2,241,321 | 6/1941 | Schlack | 260—78L |
| 3,171,829 | 3/1965 | Wiesner | 260—78L |

WILLIAM H. SHORT, Primary Examiner

L. M. PHYNES, Assistant Examiner